United States Patent
Ohshimo et al.

(10) Patent No.: US 10,015,932 B2
(45) Date of Patent: Jul. 10, 2018

(54) PLANT MANAGEMENT SYSTEM AND PLANT MANAGEMENT METHOD

(71) Applicant: TSUBAKIMOTO CHAIN CO., Osaka-shi, Osaka (JP)

(72) Inventors: Jun Ohshimo, Osaka (JP); Koichi Matsunaga, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 309 days.

(21) Appl. No.: 14/937,027

(22) Filed: Nov. 10, 2015

(65) Prior Publication Data

US 2016/0057942 A1 Mar. 3, 2016

Related U.S. Application Data

(63) Continuation of application No. PCT/JP2014/056427, filed on Mar. 12, 2014.

(30) Foreign Application Priority Data

May 15, 2013 (JP) .................................. 2013-102704

(51) Int. Cl.
*A01G 9/00* (2018.01)
*G05B 15/02* (2006.01)
(Continued)

(52) U.S. Cl.
CPC ............. *A01G 9/029* (2018.02); *A01G 9/006* (2013.01); *A01G 9/086* (2013.01); *A01G 9/088* (2013.01); *A01G 22/00* (2018.02); *G05B 15/02* (2013.01)

(58) Field of Classification Search
CPC ........ A01G 1/001; A01G 9/006; A01G 9/086; A01G 9/088; A01G 9/10; A01G 7/00; G05B 15/02
(Continued)

(56) References Cited

U.S. PATENT DOCUMENTS 8,489,352 B2* 7/2013 Higaki ................. G06Q 10/087
702/81
9,050,379 B2* 6/2015 Selker .................... A61L 2/0035
(Continued)

FOREIGN PATENT DOCUMENTS

JP 6-133645 A 5/1994
JP 2001-61342 A 3/2001
(Continued)

OTHER PUBLICATIONS

International Search Report dated Jun. 17, 2014, issued in counterpart application No. PCT/JP2014/056427 (2 pages).

*Primary Examiner* — Chun Cao
(74) *Attorney, Agent, or Firm* — Westerman, Hattori, Daniels & Adrian, LLP (57) ABSTRACT

Provided are a plant management system and a plant management method, which do not entail a substantial workload, cost, construction period, or installation space; enable a system to be easily constructed, altered and expanded; have a small maintenance load; enable processing systems to be distributed and arranged in geographically separate locations and in locations where connecting the processing systems is not easy; and are capable of preventing the occurrence of large-scale problems. A plant management system 100 has: a plurality of processing systems 140, 150; and memory tags 112, 122, wherein processing systems 140, 150 include reader-writers 142, 152, 153 and processing devices 141, 151, and, by writing plant management data into the memory tag 112 by means of the reader-writer 142 and then reading the plant management data by the reader-writer 152 of the processing system 150, the plant management data is transferred between the processing systems 140, 150.

10 Claims, 4 Drawing Sheets

(51) Int. Cl.
     *A01G 9/029*      (2018.01)
     *A01G 22/00*      (2018.01)
     *A01G 9/08*      (2006.01)

(58) Field of Classification Search
     USPC .......................................................... 700/90
     See application file for complete search history.

(56) References Cited

U.S. PATENT DOCUMENTS

| | | | |
|---|---|---|---|
| 9,345,201 B2 * | 5/2016 | Sakura | A01G 9/083 |
| 2010/0117796 A1 * | 5/2010 | Claessen | G06K 19/0723 |
| | | | 340/10.1 |
| 2011/0153220 A1 * | 6/2011 | Bolea | G01N 35/00732 |
| | | | 702/19 |

FOREIGN PATENT DOCUMENTS

| | | | |
|---|---|---|---|
| JP | 2001-78575 A | | 3/2001 |
| JP | 2001061342 | * | 3/2001 |
| JP | 2010-154789 A | | 7/2010 |
| JP | 2011-34248 A | | 2/2011 |
| JP | 2012-152151 A | | 8/2012 |

* cited by examiner

PLANT MANAGEMENT SYSTEM AND PLANT MANAGEMENT METHOD

TECHNICAL FIELD

The present invention relates to a plant management system and a plant management method for managing plants.

BACKGROUND ART

In a conventional way of managing the growths of plants such as seedlings, selection of well-grown plants by visual observation of the appearances of the plants is performed, as well as growing, transplanting and harvesting of the plants. There have recently been inspection devices that inspect the growing conditions of plants based on data other than the appearances of the plants (see Patent Literature 1, for example), and there has been a demand for the use of such inspection devices to inspect the plants, select well-grown plants based on the resultant inspection data, and grow, transplant and harvest the plants.

In order to construct a system for executing a plurality of processing steps (a growing step, a transplantation step, and a harvesting step) using those inspection devices or the like, the plant management data such as the inspection data obtained through these processing steps need to be managed comprehensively, which brings an idea of installing a database such as the one described in Patent Literature 2.

Figure 4:
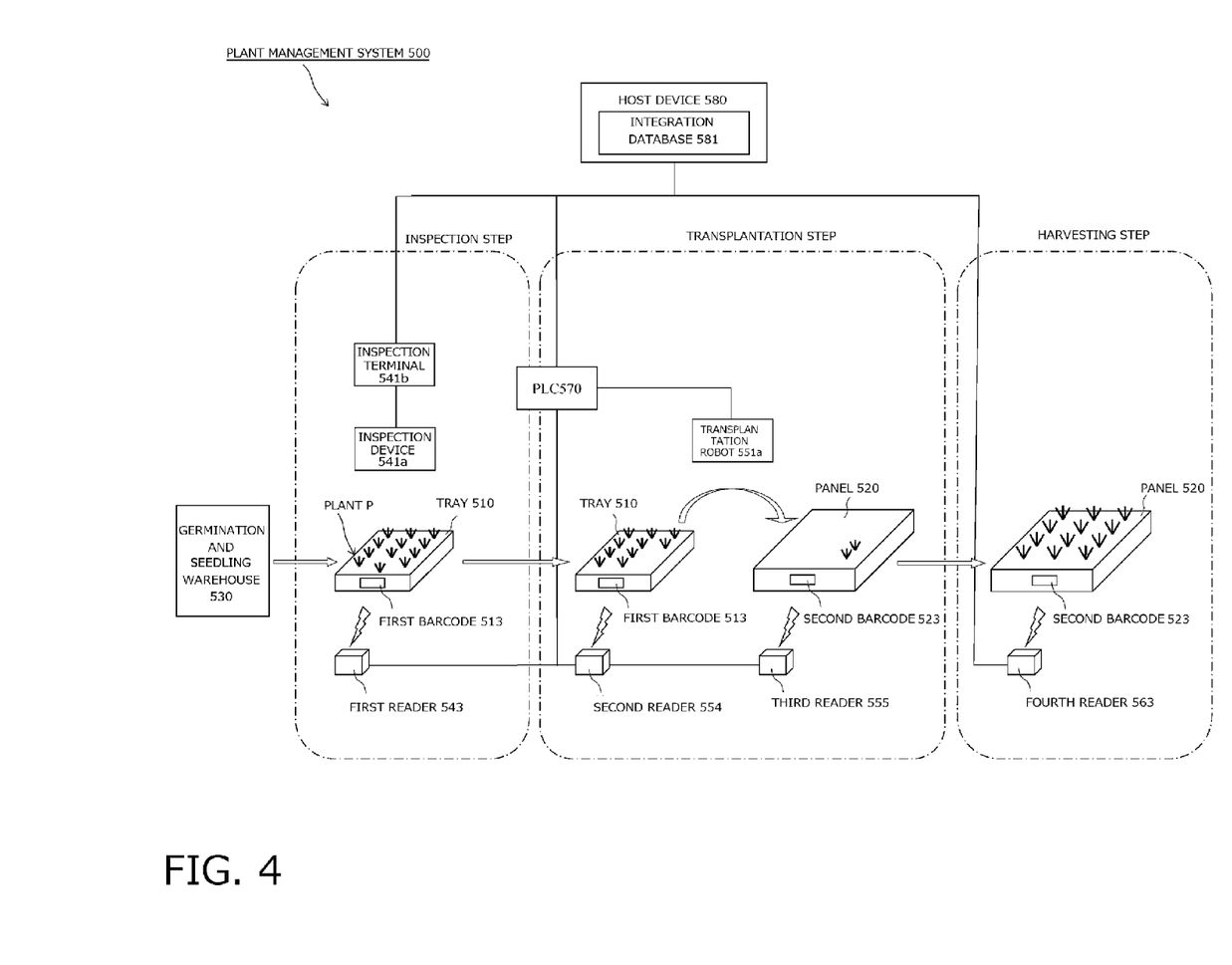
FIG. 4 is an explanatory diagram showing a plant management system as a reference example.

FIG. 4 shows a plant management system 500 as a reference example of the system executing the plurality of processing steps (the growing step, the transplantation step, and the harvesting step), to which a database such as the one described in Patent Literature 2 is applied.

In the plant management system 500 shown in FIG. 4, plants P are planted in a tray 510 and grown in a germination and seedling warehouse 530. Thereafter, a plurality of the plants P housed in the tray 510 are inspected using an inspection device 541a, and the resultant inspection data are stored in an integrated database 581 of a host device 580 through an inspection terminal 541b. In this inspection step, a first reader 543 that is connected by a PLC 570 to the host device 580 reads a first barcode 513 attached to the tray 510, to specify the tray 510.

In the next transplantation step, the inspection data stored in the integrated database 581 are referenced and the plants P in the tray 510 are transplanted into a panel 520 by a transplantation robot 551a. In this transplantation step as well, a second reader 554 and a third reader 555 that are connected by the PLC 570 to the host device 580 read the first barcode 513 attached to the tray 510 and a second barcode 523 attached to the panel 520, to specify the tray 510 and the panel 520.

In the next harvesting step, a fourth reader 563 connected to the host device 580 reads the second barcode 523 attached to the panel 520, to specify the panel 520, followed by harvesting of the plants P.

CITATION LIST

Patent Literatures

Patent Literature 1: Japanese Patent Application Laid-open No. 2012-152151
Patent Literature 2: Japanese Patent Application Laid-open No. 2011-034248

BRIEF SUMMARY OF THE INVENTION

Problems to be Solved by the Invention

In this plant management system 500, however, the integrated database 581 needs to be constructed for the purpose of managing the plant management data such as the inspection data comprehensively, as described above, and the processing systems for the processing steps need to be connected to one another, which requires a substantial workload, cost, construction period, or installation space in order to construct the plant management system 500.

Moreover, even when altering or expanding a system, the entire plant management system 500 needs to be stopped, requiring a substantial workload, cost, and/or construction period.

The need to install the integrated database 581 requires a tremendous amount of workload in operation and maintenance of the integrated database 581. In addition, in the case of failure in the integrated database 581, there is a risk that all the plant management data might be lost, and equipment such as an uninterruptible device is necessary for the purpose of ensuring redundancy. Furthermore, in the case of a significant increase in the number of trays 510 or panels 520 to be handled, not only is it necessary to increase the capacity of the integrated database 581, but also the design of the integrated database 581 needs to be changed.

The need to connect the processing systems for the processing steps to one another raises a problem that it is difficult to install the processing systems in geographically separate locations and in locations where connecting the processing systems is not easy, such as farmhouses and factories.

Moreover, because the processing systems for the processing steps are connected to one another, a single problem that occurs in one site spreads over the entire plant management system 500, possibly resulting in a large-scale problem.

The present invention was contrived in order to solve the foregoing problems, and an object thereof is to provide a plant management system and a plant management method that do not entail a substantial workload, cost, construction period, or installation space, enable a system to be easily constructed, altered and expanded, have a small maintenance load, enable processing systems to be distributed and arranged in geographically separate locations and in locations where connecting the processing systems is not easy, and are capable of preventing the occurrence of large-scale problems.

A plant management system according to the present invention is a plant management system for managing plants and solves the foregoing problems with the following configuration. Specifically, the plant management system has: a plurality of processing systems that are provided independently of one another; and a memory tag provided in a plant container and storing plant management data, wherein the plurality of processing systems each include a reader-writer capable of reading and writing plant management data from and into the memory tag, and a processing device connected to the reader-writer, and, by writing plant management data into the memory tag by means of the reader-writer and then reading the plant management data by the reader-writer of a subsequent processing system, the plant management data is transferred between the plurality of processing systems.

A plant management method according to the present invention is a plant management method for managing plants and solves the foregoing problems with the following configuration. Specifically, the plant management method has: providing a plant container with a memory tag for storing plant management data; installing, for each of processing steps, a processing system that includes a reader-writer capable of reading and writing plant management data from and into the memory tag, and a processing device connected to the reader-writer; and transferring plant management data between the plurality of processing systems by writing the plant management data into the memory tag by means of the reader-writer and then reading the plant management data by the reader-writer of a subsequent processing system.

According to an aspect of the invention, a plant container is provided with a memory tag for storing plant management data and a reader-writer and a processing device are disposed in each processing system, so that the plant management data can be transferred between the plurality of processing systems by means of the memory tag provided in the plant container and the reader-writer disposed in each of the processing systems. Therefore, comprehensive plant management is possible through the processing systems, without the need to connect the processing systems to one another or to provide an integrated database for comprehensively managing the plant management data.

Such a configuration not only eliminates the need to construct an integrated database but also is capable of disposing the processing systems independently. Therefore, the plant management system can easily be constructed without requiring a substantial workload, cost, construction period, or installation space.

Because the processing systems are disposed independently of one another, the entire plant management system does not need to be stopped even when a system needs to be altered or expanded. Consequently, systems can be altered or expanded individually with respect to each processing system, enabling easy alteration and expansion of a system without requiring a substantial workload, cost, or construction period.

In addition, because an integrated database is not required, not only is it possible to reduce the workload associated with operating and managing an integrated database, but also the risk of losing all the plant management data due to failure in the integrated database can be avoided, and equipment such as an uninterruptible device for ensuring redundancy is not required. Furthermore, even in the case of a significant increase in the number of plant containers to be handled, such a case can be dealt with by increasing the number of memory tags in accordance with the number of plant containers, without increasing the capacity of the integrated database or changing the design of the same.

Installation of the processing systems independently enables the processing systems to be installed easily in geographically separate locations and in locations where connecting the processing systems is not easy, such as farmhouses and factories.

Moreover, providing the processing systems independently of one another can prevent a single problem of one site from spreading over the entire plant management system, and thus prevent the occurrence of a large-scale problem.

According to another aspect of the invention, the plant management data includes individual management data on a plurality of plants housed in the plant container. Therefore, the plurality of plants in the plant container can be processed individually in an appropriate manner, improving the productivity of the plants.

According to another aspect of the invention, because the memory tag is attached to an outer surface of the plant container, the position of each of the plants in the plant container can be defined based on the position of the memory tag on the plant container. Therefore, it is not necessary to provide an additional baseline for defining the positions of the plants in the plant container.

According to another aspect of the invention, at least two processing systems are installed in mutually different facilities, so that the processing steps can be distributed and executed in a plurality of facilities, reducing the scale of each required facility.

According to another aspect of the invention, the inspection data obtained by the processing device of the inspection system is written as the plant management data into the memory tag by the reader-writer of the inspection system, and the plants are transplanted by the processing device of the transplantation system using the inspection data that is read from the memory tag by the reader-writer of the transplantation system. Owing to this configuration, appropriate plant transplantation can be realized in keeping with the inspection data, without connecting the processing systems to one another or without requiring an integrated database for comprehensively managing the plant management data.

According to another aspect of the invention, the processing device of the transplantation system transplants only well-grown plants out of the plurality of plants housed in the plant container, based on the inspection data. Therefore, unlike such a situation where a plurality of plants in a plant container are discarded altogether merely due to the fact that some of the plants grow poorly, the productivity of the plants can be improved by reducing the number of plants to be discarded.

According to another aspect of the invention, because the reader-writer of the harvesting system reads the harvest time data that is stored beforehand in the memory tag as the plant management data, the plants can be harvested at an appropriate harvest time without connecting the processing systems to one another or without requiring an integrated database for comprehensively managing the plant management data. In addition, because the harvesting system does not need to be connected to another inspection system or transplantation system, the harvesting system can be installed in a location such as a farmhouse where connection with another processing system is not easily made.

According to another aspect of the invention, the reader-writer is a noncontact-type reader-writer. Therefore, even when dirt or mud is stuck on the memory tag, reading by the reader-writer is not inhibited, and tasks such as taking inventory of plant containers can easily be performed.

According to another aspect of the invention, the inspection data obtained by the processing device of the inspection system is written as the plant management data into the memory tag by the reader-write of the inspection system, and the processing device of the transplantation system transplants plants by using the inspection data that is read from the memory tag by the reader-writer of the transplantation system. Furthermore, the reader-writer of the transplantation system reads the harvest time data that is stored beforehand in the memory tag as the plant management data. Therefore, appropriate plant transplantation can be realized in keeping with the inspection data and the plants can be harvested at an appropriate harvest time, without connecting the processing systems to one another or without requiring an integrated database for comprehensively managing the plant management data.

EXPLANATION OF REFERENCE NUMERALS 100, 500 . . . Plant management system
110, 510 . . . Tray (first plant container)
111 . . . Plant housing region
112 . . . First memory tag
513 . . . First barcode
120, 520 . . . Panel (second plant container)
121 . . . Plant housing region
122 . . . Second memory tag
523 . . . Second barcode
130, 530 . . . Germination and seedling warehouse
140 . . . Inspection system (first processing system)
141 . . . Inspection processing device
141a, 541a . . . Inspection device
141b, 541b . . . Inspection terminal
142 . . . First reader-writer
543 . . . First reader
150 . . . Transplantation system (second processing system)
151 . . . Transplantation processing device
151a, 551a . . . Transplantation robot
151b . . . Transplantation controller
151c . . . Transplantation terminal
152 . . . Second reader-writer
153 . . . Third reader-writer
554 . . . Second reader
555 . . . Third reader
160 . . . Harvesting system (third processing system)
161 . . . Harvesting processing device
161a . . . Harvesting device
161b . . . Harvesting terminal
162 . . . Fourth reader-writer
563 . . . Fourth reader
570 . . . PLC
580 . . . Host device
581 . . . Integrated database
P . . . Plant

BEST MODE FOR CARRYING OUT THE INVENTION

The present invention is a plant management system for managing plants, the plant management system having: a plurality of processing systems that are provided independently of one another; and a memory tag provided in a plant container and for storing plant management data, wherein the plurality of processing systems each include a reader-writer capable of reading and writing plant management data from and into the memory tag, and a processing device connected to the reader-writer, and, by writing plant management data into the memory tag by means of the reader-writer and then reading the plant management data through the reader-writer of a subsequent processing system, the plant management data is transferred between the plurality of processing systems. The specific configuration of the plant management system may be in any form as long as the plant management system does not entail a substantial workload, cost, construction period, or installation space, enables a system to be easily constructed, altered and expanded, has a small maintenance load, enables the processing systems to be distributed and arranged in geographically separate locations and in locations where connecting the processing systems is not easy, and is capable of preventing the occurrence of large-scale problems.

For example, the specific aspect of the memory tag may be in any form such as noncontact-type tags as represented by a RFID tag or contact-type tags as represented by a magnetic tape, as long as the tag can store various data. The same applies to the specific aspect of the reader-writer.

The installation aspects for the processing systems (an inspection system, a transplantation system, and a harvesting system) may include any aspects. Specifically, the processing systems may be installed, for example, in the same facility or mutually different facilities.

The following embodiment describes that a tray into which plants are not yet transplanted and a panel transplanted with plants are provided with the memory tags. However, the memory tag may be provided only to the tray into which plants are not yet transplanted or only to the panel transplanted with plants.

EMBODIMENT

A plant management system 100, an embodiment of the present invention, is described hereinafter with reference to FIGS. 1 to 3.

Figure 1:
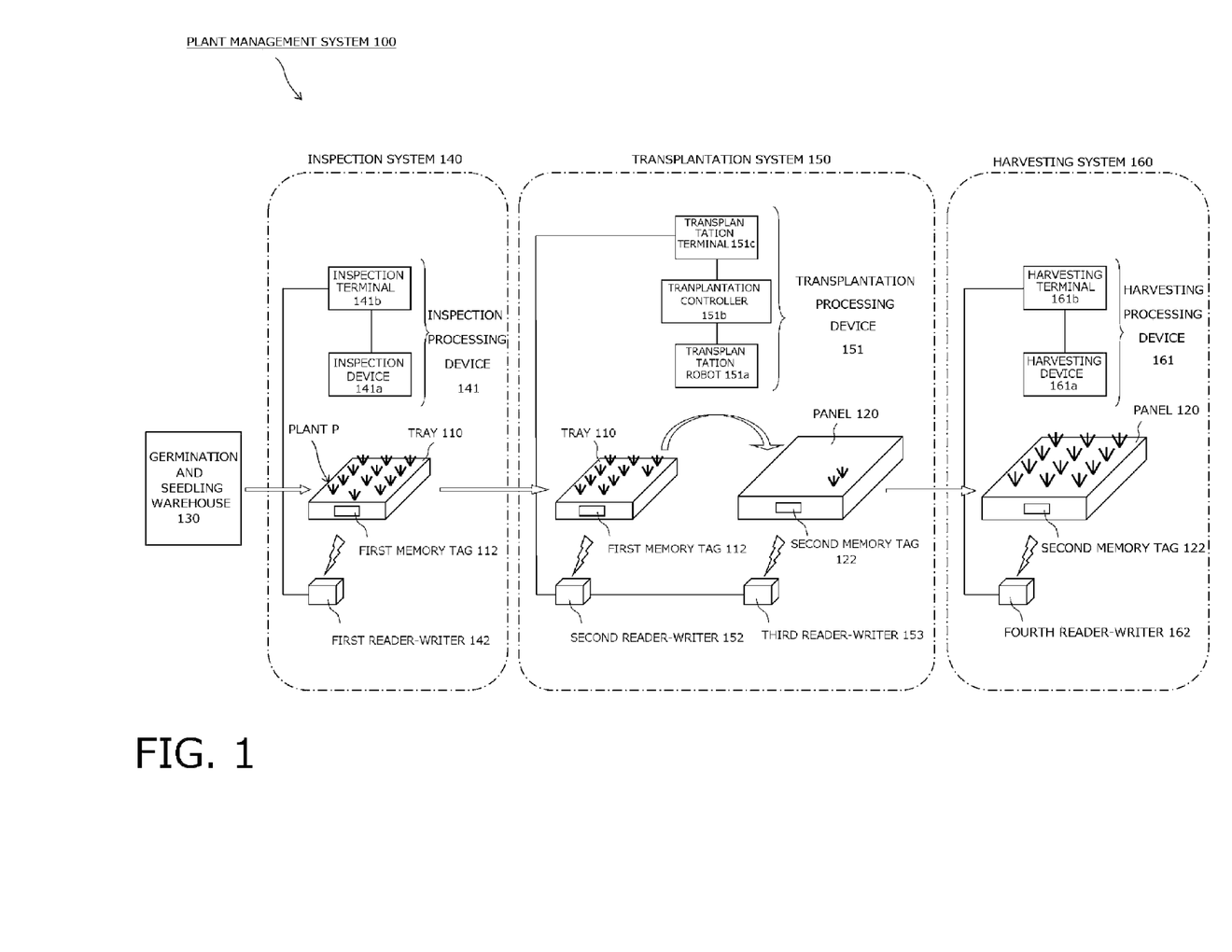
FIG. 1 is an explanatory diagram showing a plant management system according to an embodiment of the present invention.

First of all, the plant management system 100 is for managing plants P such as seedlings, and is configured by, as shown in FIG. 1, a tray 110 and panel 120 for housing a plurality of plants P, (first and second) memory tags 112, 122 attached to the tray 110 and panel 120 and for storing plant management data, a germination and seedling warehouse 130 for germinating and raising the plants P, an inspection system 140 for inspecting the growing conditions of the plants P, a transplantation system 150 for transplanting the plants P, and a harvesting system 160 for harvesting the plants P. As shown in FIG. 1, the inspection system 140, the transplantation system 150 and the harvesting system 160 are not connected to one another by a network but are provided independently of one another.

Figure 2:
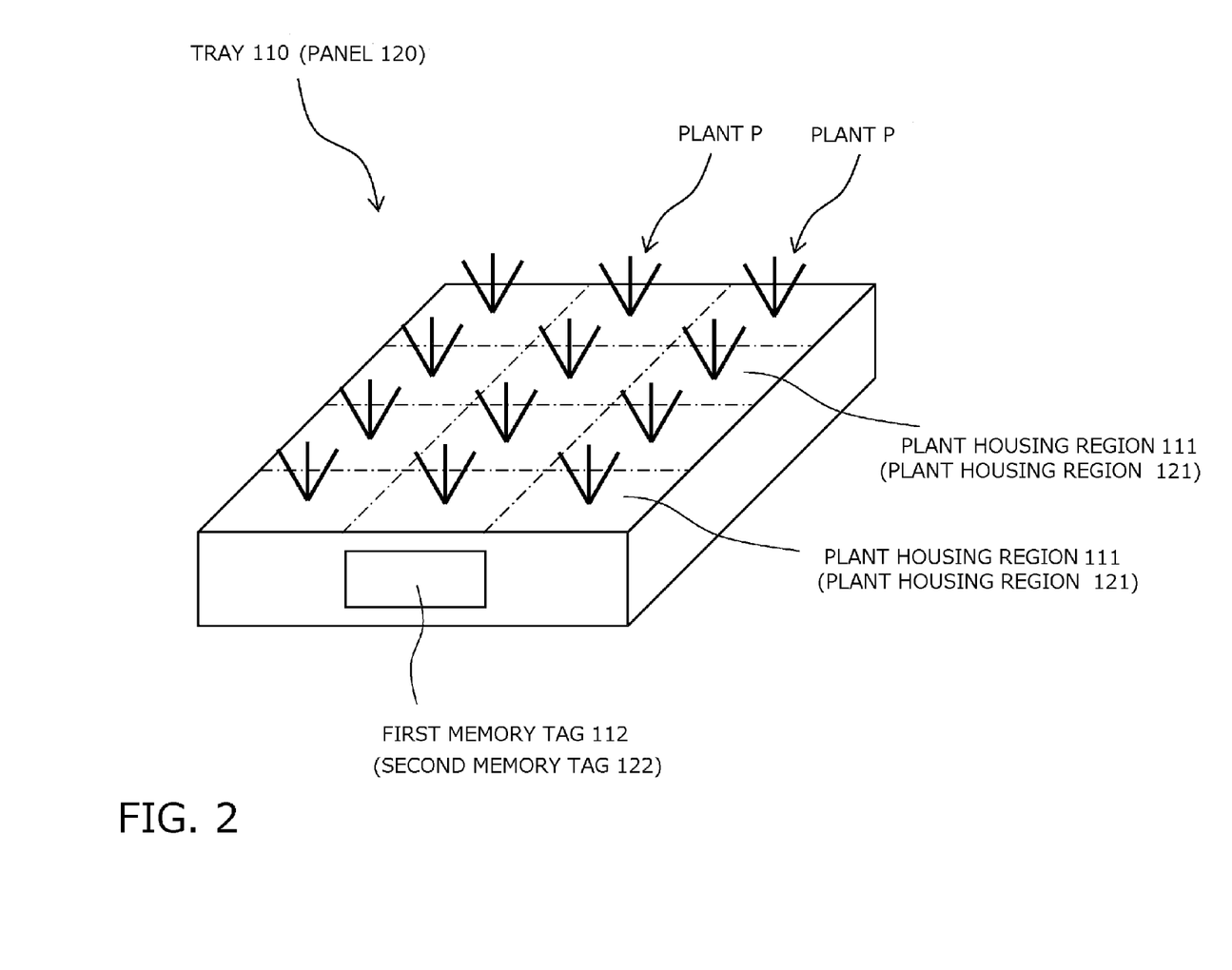
FIG. 2 is an explanatory diagram showing a plant container from obliquely above.
Figure 3:
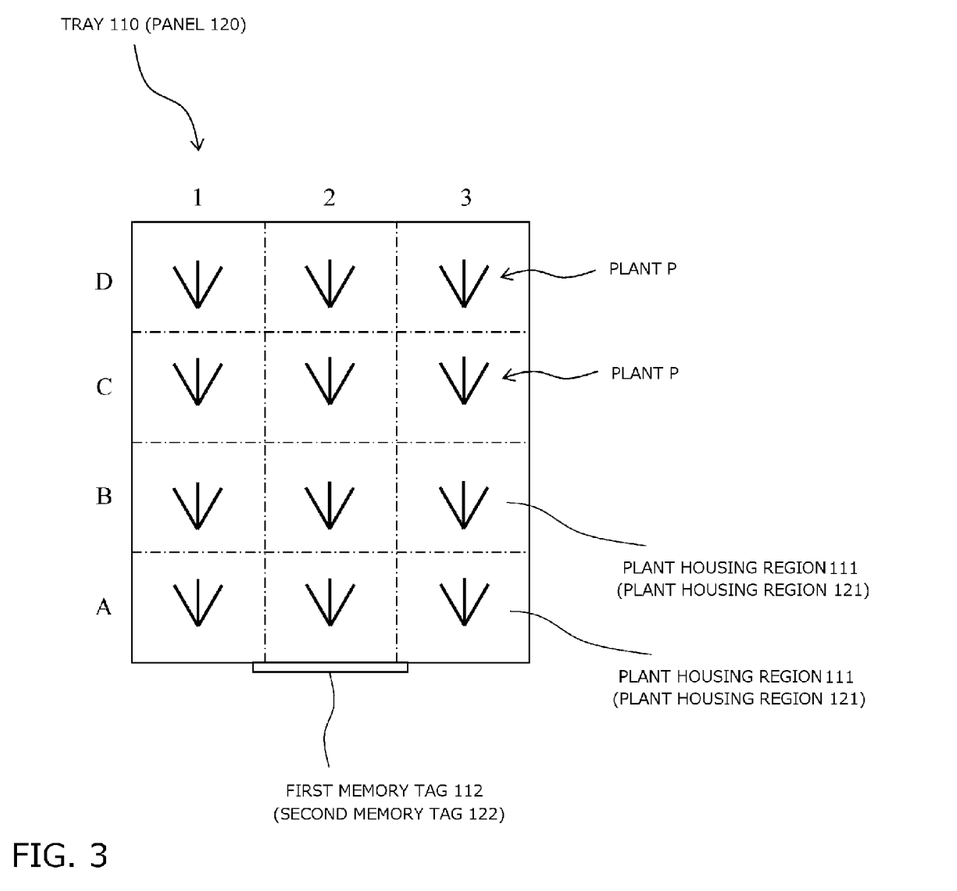
FIG. 3 is an explanatory diagram showing the plant container from above.

The tray 110 and the panel 120 are each a plant container that is opened upward, as shown in FIG. 2, and has a plurality of plant housing regions 111, 121, which are divided vertically and horizontally. As shown in FIG. 3, in the present embodiment, the positions of the plant housing regions 111, 121 are defined by the rows A to D and columns 1 to 3, based on the positions of the memory tags 112, 122 attached respectively to the sides of the tray 110 and panel 120. It should be noted that there are no restrictions, for example, on the number of the plant housing regions 111, 121 or arrangements thereof.

The memory tags 112, 122 are configured as RFID (Raid Frequency Identification) tags and, as shown in FIG. 2, attached to sides of the tray 110 and panel 120, respectively. In the present embodiment, although the memory tags 112, 122 are configured as passive RFID tags that respond by converting the radio waves radiated from reader-writers 142, 152, 153, 162 into power, the memory tags 112, 122 may be configured as active RFID tags that incorporate power sources therein.

Individual management data on each of the plants P on the tray 110 and panel 120 is stored in the memory tags 112, 122. Examples of the specific contents of the individual management data include inspection data on each of the plants P acquired using an inspection processing device 141, position data on each of the plants P in the tray 110 and panel 120, and harvest time data on each of the plants P.

As shown in FIG. 1, the inspection system 140 is configured by the inspection processing device 141 and the first reader-writer 142 that is connected to the inspection processing device 141 with a wire or wirelessly.

As shown in FIG. 1, the inspection processing device 141 is configured by an inspection device 141a for inspecting the growing conditions of the plants P and an inspection terminal 141b connected to the inspection device 141a. The specific aspect of the inspection device 141a may be in any form as long as it can inspect the growing conditions of the plants P, and examples of the specific aspect of the inspection device 141a include the inspection device disclosed in Japanese Patent Application Laid-open No. 2012-152151. The inspection terminal 141b is configured as a personal computer or the like and has a storage unit, an input unit, an output unit, a control unit, a communication unit, an auxiliary storage device, and the like. The first reader-writer 142 is configured as a noncontact-type RFID reader-writer that is capable of wirelessly reading and writing plant management data from and to the first memory tag 112 using a predetermined frequency bandwidth, by approaching the first memory tag 112 configured as a RFID tag. The first reader-writer 142 is connected to the inspection terminal 141b.

As shown in FIG. 1, the transplantation system 150 is configured by a transplantation processing device 151 and the (second and third) reader-writers 152, 153 that are connected to the transplantation processing device 151 with wires or wirelessly.

As shown in FIG. 1, the transplantation processing device 151 is configured by a transplantation robot 151a for automatically transplanting the plants P, a transplantation controller 151b connected to the transplantation robot 151a, and a transplantation terminal 151c connected to the transplantation controller 151b. As shown in FIG. 1, the transplantation robot 151a transplants the plants P housed in the tray 110 to the panel 120. The specific aspect of the transplantation robot 151a may be in any form and examples thereof include the transplantation robot disclosed in Japanese Patent Application Laid-open No. 2000-93027. The transplantation controller 151b and the transplantation terminal 151c are each configured as a personal computer, a server or the like and each have a storage unit, an input unit, an output unit, a control unit, a communication unit, an auxiliary storage device, and the like. The reader-writers 152, 153 have the same configuration as the first reader-writer 142 and are connected to the transplantation terminal 151c, as shown in FIG. 1.

As shown in FIG. 1, the harvesting system 160 is configured by a harvesting processing device 161 and the fourth reader-writer 162 that is connected to the harvesting processing device 161 with a wire or wirelessly.

As shown in FIG. 1, the harvesting processing device 161 is configured by a harvesting device 161a for automatically harvesting the plants P and a harvesting terminal 161b connected to the harvesting device 161a. The harvesting terminal 161b is configured as a personal computer, a PLC, or the like, and has a storage unit, an input unit, an output unit, a control unit, a communication unit, an auxiliary storage device, and the like. The fourth reader-writer 162 has the same configuration as the first reader-writer 142 and is connected to the harvesting terminal 161b, as shown in FIG. 1.

A processing flow of the plant management system 100 is described next with reference to FIG. 1.

First, the plurality of plants P planted in the tray 110 are germinated and raised in the germination and seedling warehouse 130, and thereafter the tray 110 is carried to the inspection step.

Next, in the inspection step, each of the plants P housed in the tray 110 is specified by causing the first reader-writer 142 to read the plant management data stored in the first memory tag 112, and the inspection device 141a inspects, one by one, the growing conditions of the plants P in the tray 110. Subsequently, the inspection data obtained by the inspection device 141a are written into the first memory tag 112 by the first reader-writer 142. Note that this inspection step is carried out approximately several times per day.

In the next transplantation step, each of the plants P in the tray 110 is specified and the plant housing regions 121 in the panel 120 are specified, by causing the second reader-writer 152 to read the plant management data stored in the first memory tag 112 and causing the third reader-writer 153 to read the plant management data stored in the second memory tag 122. Then, using the inspection data stored in the first memory tag 112, the transplantation robot 151a transplants only the well-grown plants P from the tray 110 to the panel 120. The poorly grown plants P are discarded. Next, the third reader-writer 153 writes, into the second memory tag 122, the transplantation data indicating which plants P are transplanted.

Although the above has described that the transplantation step transplants only the well-grown plants P to the panel 120, the details of the transplantation step are not limited to this process; thus, for example, a plurality of panels 120 may be prepared and a transplantation destination panel 120 may be selected from among the plurality of panels 120 in accordance with the growing condition of each plant P, the types of the plants P and the like.

Subsequently, in the harvesting step, each of the plants P housed in the panel 120 is specified and the harvest time of each plant P is read by causing the fourth reader-writer 162 to read the plant management data stored in the second memory tag 122, to harvest the plants P by means of the harvesting device 161a.

Although the above has described that the harvesting device 161a automatically harvests the plants P, the specific aspect of the harvesting device 161a is not limited to this configuration; thus, for example, the plants P to be harvested may be designated using a laser pointer or the like. Alternatively, the harvesting device 161a may be provided with a notification unit, such as a display, that is configured integrally with or separately from the fourth reader-writer 162 and function to notify, using the notification unit, an operator of the harvest time data and the data on the plants P to be harvested that are read from the second memory tag 122 by the fourth reader-writer 162. In addition, a second inspection step of inspecting the growing condition of each plant P may be provided as a pre-process of the harvesting step, in which only the well-grown plants P are harvested based on the inspection data obtained in this second inspection step.

The invention claimed is:

1. A plant management system for managing plants, comprising:
    a first plant container having plant housing regions;

a first memory tag provided on the first plant container storing plant management data regarding plants in the plant housing regions of the first plant container;

a second plant container having plant housing regions;

a second memory tag provided on the second plant container storing plant management data regarding plants in the plant housing regions of the second plant container;

an inspection system including an inspection processing device and a first reader-writer, the inspection processing device generating inspection data from growing conditions of the plants in the plant housing regions of the first plant container, the first reader-writer writing the inspection data and corresponding position data of the plants in the plant housing regions of the first plant container as the plant management data into the first memory tag; and a transplantation system including a transplantation processing device and a second reader-writer, the transplantation processing device transplanting at least one of the plants from the first plant container into at least one of the plant housing regions of the second plant container using the plant management data read by the second reader-writer from the first memory tag and using the plant management data read by the second reader-writer from the second memory tag, wherein the inspection system and the transplantation system are independent of one another, without using any centralized database for the plant management data.

2. The plant management system according to claim 1, wherein the inspection system and the transplantation system are provided in different facilities.

3. The plant management system according to claim 1, wherein the transplantation processing device transplants the at least one of the plants from the first plant container using the plant management data read by the second reader-writer from the first memory tag that satisfies a criteria related to a maturity of the plants.

4. The plant management system according to claim 1, wherein each of the first reader-writer and the second reader-writer is a noncontact-type reader-writer.

5. The plant management system according to claim 1, wherein the plant management data read by the second reader-writer from the second memory tag includes position data of at least one of the plant housings of the second plant container that is available for transplantation of the at least one of the plants in the first plant container.

6. The plant management system according to claim 1, wherein the transplantation system further includes a third reader-writer, the third reader-writer writing transplantation data as the plant management data into the second memory tag, the transplantation data including position data of at least one of the plant housings of the second plant container into which the at least one of the plants in the first plant container is transplanted.

7. The plant management system according to claim 1, further comprising a harvesting system including a harvesting processing device and a third reader-writer, the harvesting processing device harvesting at least one of the plants in the plant housing regions of the second plant container using the plant management data read from the second memory tag by the third reader-writer, wherein the inspection system, the transplantation system, and the harvesting system are provided independently of one another, without using any centralized database for the plant management data.

8. A plant management method for managing plants, comprising the steps of:

providing an inspection system and a transplantation system that are independent of one another, without using any centralized database for plant management data;

generating, by an inspection processing device of the inspection system, inspection data from growing conditions of plants in plant housing regions of a first plant container;

writing, by a first reader-writer of the inspection system, the inspection data and corresponding position data of the plants in the plant housing regions of the first plant container as the plant management data into a first memory tag provided on the first plant container; and transplanting, by a transplantation processing device of the transplantation system, at least one of the plants from the first plant container into at least one of plant housing regions of a second plant container using the plant management data read by a second reader-writer of the transplantation system from the first memory tag and using plant management data read by the second reader-writer from a second memory tag provided on the second plant container.

9. The plant management method according to claim 8, wherein the plant management data read by the second reader-writer from the second memory tag includes position data of at least one of the plant housings of the second plant container that is available for said transplanting of the at least one of the plants in the first plant container.

10. The plant management method according to claim 8, further comprising:

providing a harvesting system that is independent from each of the inspection system and the transplantation system, without using any centralized database for the plant management data; and harvesting, by a harvesting processing device of the harvesting system, at least one of the plants in the plant housing regions of the second plant container using the plant management data read from the second memory tag by a third reader-writer of the harvesting system.

* * * * *